US005365821A

United States Patent [19]

Munier et al.

[11] Patent Number: 5,365,821

[45] Date of Patent: Nov. 22, 1994

[54] SHOULDER KNIFE AND CUTTING DEVICE

[75] Inventors: Regis J. R. Munier, Les Marguerous-Rosey; Oliver L. E. Berne, Saint-Marcel; Serge D. Serpillon, Gergy, all of France

[73] Assignee: Eastman Kodak Company, Rochester, N.Y.

[21] Appl. No.: 861,858

[22] PCT Filed: Dec. 6, 1990

[86] PCT No.: PCT/FR90/00884

§ 371 Date: Jun. 12, 1992

§ 102(e) Date: Jun. 12, 1992

[87] PCT Pub. No.: WO91/09711

PCT Pub. Date: Jul. 11, 1991

[30] Foreign Application Priority Data

Dec. 12, 1989 [FR] France .......................... 89 00016676

[51] Int. Cl.$^5$ .............................................. B23D 19/04

[52] U.S. Cl. ........................................ 83/500; 83/501; 83/675; 83/676

[58] Field of Search ................. 83/498, 500, 501, 502, 83/503, 507, 508.2, 508.3, 495, 496, 497, 504, 345, 675, 676

[56] References Cited

U.S. PATENT DOCUMENTS

| | | | |
|---|---|---|---|
| 2,239,623 | 4/1941 | Oster | 164/70 |
| 3,055,249 | 1/1962 | Lord | 83/501 |
| 3,261,249 | 7/1966 | Holt | 83/349 |
| 3,286,574 | 4/1964 | Durand | 83/501 |
| 3,465,631 | 9/1969 | Reeder, Jr. | 83/500 |
| 3,730,043 | 5/1973 | Zimmermann | 83/502 |
| 3,977,385 | 8/1976 | Mansfield | 123/195 R |
| 4,061,063 | 12/1977 | Brush | 83/55 |
| 4,428,265 | 1/1984 | Bolton | 83/502 |
| 4,972,750 | 11/1990 | Paavola | 83/500 |

FOREIGN PATENT DOCUMENTS

| | | | |
|---|---|---|---|
| 1052582 | 12/1966 | United Kingdom | 83/508.3 |

*Primary Examiner*—Eugenia Jones
*Assistant Examiner*—Allan M. Schrock
*Attorney, Agent, or Firm*—Charles E. Snee, III

[57] ABSTRACT

The invention relates to a circular knife (12) as well as a cutting device (11-15) for cutting materials into webs. The cutting device comprises at least one circular knife (12) arranged on a shaft (11) and characterized in that the circular knife is directly mounted on the shaft, the knife being maintained in the cutting position by means of two spacer rings (13) located on both sides of the knife. The knife is characterized in that, when it is mounted according to the present invention device, it exhibits a suitable flexibility, in order, when operating, to generate a pressure on a lower knife whose variations with respect to a mean value do not exceed 10% in absolute value.

2 Claims, 4 Drawing Sheets

SHOULDER KNIFE AND CUTTING DEVICE

FIELD OF THE INVENTION

The invention relates to a circular knife as well as a cutting device, in order to cut materials longitudinally into webs, such as photographic webs.

BACKGROUND OF THE INVENTION

Generally, the knives used in this type of application are mounted on a shaft and spaced according to the desired cutting width. These knives are known generally as "upper-knives". This knife-shaft is mounted opposite to a second shaft parallel to the first one, and on which are mounted lower knives against which the upper knives are urged into contact.

It is a common practice to arrange the knives in such a manner, in order to manufacture photographic films or soft metal webs and particularly to cut webs adapted to record magnetic sounds. During use, such webs are guided on both sides, along their edges, when passing on the recorder heads, and in this case, parallelism defects should not exceed some hundredths of a millimeter.

When cutting the materials into webs, the knives often wear away very quickly and, when the wear becomes too significant, the knives cut by compression, thus giving webs with very uneven or curved edges and with a significant dusting level. The knives must then be replaced and reground.

It is obvious that the frequent removal and reinsertion of the knives highly decrease the productivity of the cutting devices using such knives.

Up to now, various cutting devices have been used. Thus, the french patent 2 439 736 discloses a cutting device including a lower knife-shaft and an upper knife-shaft, which are parallel between them, and both driven and inserted into stationary bearings.

The lower knives comprise plane front faces rigidly flanged axially on the lower knife-shaft. The corresponding upper knives, mounted on the upper knife-shaft, come into engagement between these front faces. The upper knives are each formed by assembling a hub on which are mounted a spacer ring centered in the length direction with, on both sides, a resilient plane annular knife pressed on an inner collar, these elements being pressed against one another by means of spring discs. According to this patent, the spacer height corresponds approximately to the resilient knife height. However, when such knives are ground, which seems difficult to perform without removing them from the shaft, the knife height is necessarily reduced, thus implying also that the spacer height is reduced. Necessarily, this consumes time and this is not a very economical solution, a simpler but still less economical solution consisting in changing the knives each time some degree of wear is reached.

The U.S. Pat. No. 3,286,574 discloses a cutting device in which upper and lower knives are flexible discs mounted on two parallel shafts, the upper knives being urged into contact, by the edge of one of their faces, with the lower knives. Such a system exhibits drawbacks as, during disc grinding, the height of these discs is necessarily reduced, and their flexibility is altered, and then it is necessary to modify the respective positioning of the shafts, thus leading to a more complicated device. In addition, there are matching problems between the upper and the lower knives, particularly when the knife-shafts contain a lot of discs located side by side according to a pitch which must be as regular as possible, in order that all the upper knives will be simultaneously urged into contact with the lower knives. Thus, positioning errors of the order of a few microns on each knife will involve, at the end of the shaft, an error of a few tenths of a millimeter. And as the grinding of such discs is performed on the disc edge, it is not possible to correct these errors in a simple way. Moreover, such a device is not adapted for significant web widths, such as those used for photographic materials.

There are also other types of knives, generally used for this kind of application. Among them, are the so called "shoulder knives". These knives, which will be described with more detail hereinafter, are formed of discs having a central hole, in order to be mounted on a cutting shaft while having a single freedom degree, the translation, and comprising at the periphery of one of their faces, a shoulder adapted to be urged into contact with a lower knife, also mounted on a shaft parallel to the first one. The pressure of the upper knives on the lower knives is applied by means of spring devices or other mechanical devices arranged at the back of each knife. Such devices, by reason of mechanical tolerances, create problems concerning the control of the pressure exerted by the upper knife on the lower knife, thus involving an uneven wear of the shoulder at the periphery of the upper knife. Necessarily, it results in variations in the cut web's width. The resulting dusting level on the cutting edges is significant, thus unfavorably affecting the quality of the resulting webs. Moreover, such knives are difficult to grind directly on the shaft, and, by reason of the complex mounting mechanism of these knives, the grinding operation consumes much time. Finally, these knives are-heavy, which is a significant drawback for a cutting shaft on which up to 100 knives and more, can be mounted.

SUMMARY OF THE INVENTION

Thus, it is an object of the present invention to provide a cutting device which knives are directly grindable on the cutting shaft.

Another object of the present invention is to provide a light knife intended to be mounted on a cutting shaft in a manner more simple than before.

Another object of the present invention is to provide a knife whose service life is longer than that of the prior art knives.

Yet another object of the present invention is to provide a cutting device which obtains a cutting quality better than that obtained with the prior art devices.

Yet another object of the present invention is to provide a cutting device adapted to cut webs having a significant width.

Other objects will appear in the following more detailed disclosure.

These objects are achieved by means of a cutting device for longitudinally cutting materials into webs, comprising a cutting shaft on which is mounted at least one upper knife formed of a disc having a central hole and comprising, at the periphery of one of its faces, a shoulder intended to be urged into contact with a lower knife also mounted on a shaft parallel to the first one, characterised in that the upper knife is directly mounted on the cutting shaft, and the upper knife is maintained in cutting position by means of two rings arranged on one on each side of the knife.

The invention relates also to a knife formed of a disc having a central hole and comprising at the periphery of one of its faces a shoulder intended to be urged into contact with a lower knife, also mounted on a shaft parallel to the first one, characterized in that, when it is mounted according to the previously mentioned device, it exhibits a suitable flexibility, in order, when operating, to generate a pressure on the lower knife, whose variations with respect to a mean value, do not exceed 10% in absolute value.

BRIEF DESCRIPTION OF THE DRAWINGS

The following detailed disclosure will be made with reference to the accompanying drawings where.

DETAILED DESCRIPTION OF THE INVENTION

Figure 1:
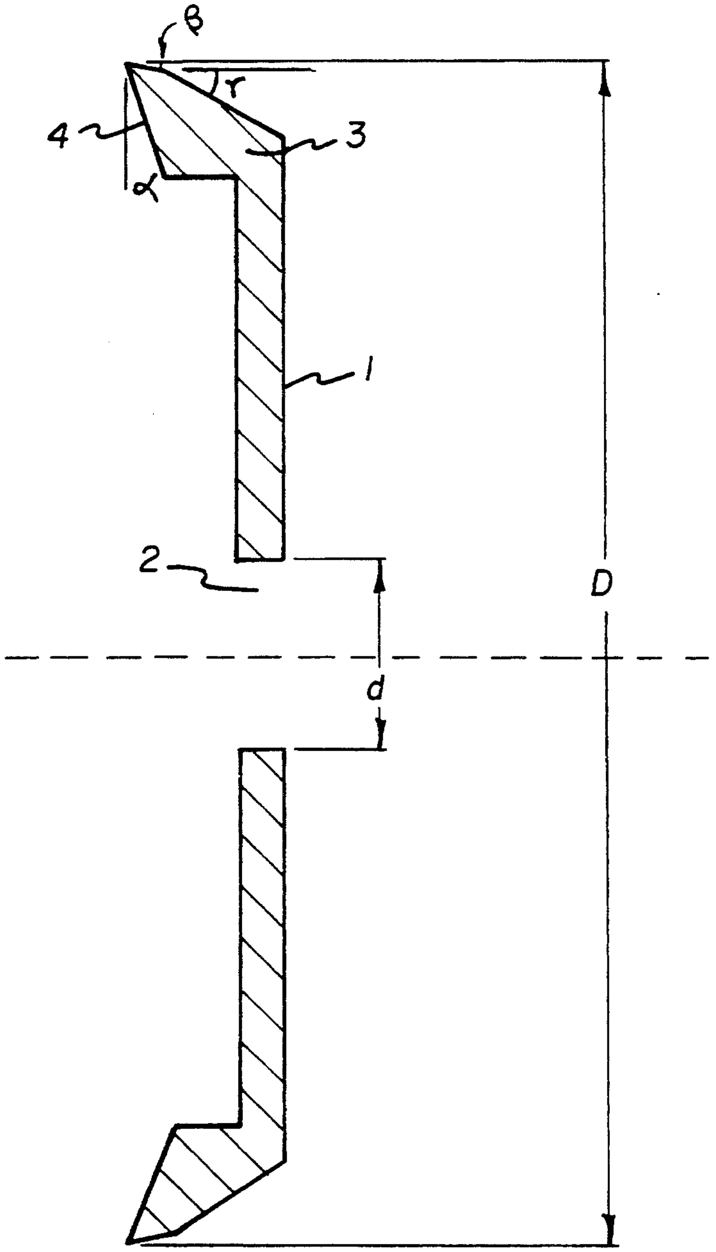
FIG. 1 (PRIOR ART)
FIG. 1 schematically illustrates a sectional elevation view of a knife as known in the prior art.

Now, with reference to FIG. 1, a knife, such as known in the prior art, of the type of a shoulder knife, is schematically illustrated. The knife is formed of a disc (1) having a central hole (2), in order to be mounted on a cutting shaft, via a ring or support, according to the prior art. It comprises, at the periphery of one of its faces, a radially and axially extending shoulder (3) intended to be urged into contact with a lower knife, also mounted on a shaft arranged parallel to the first shaft. The leading face (4) of the shoulder, i.e., the face urged into contact with the lower knife, defines an angle $\alpha$ with respect to the vertical line, called relief angle, and ranging from $+0.5°$ to $+5°$. The upper surface of the shoulder is generally designed in order to form a rake angle $\beta$ ranging from 0 to 45° and is optionally followed by a second surface defining an angle $\gamma$, sometimes called second rake angle. which can vary between 10 to 45°.

Figure 2:
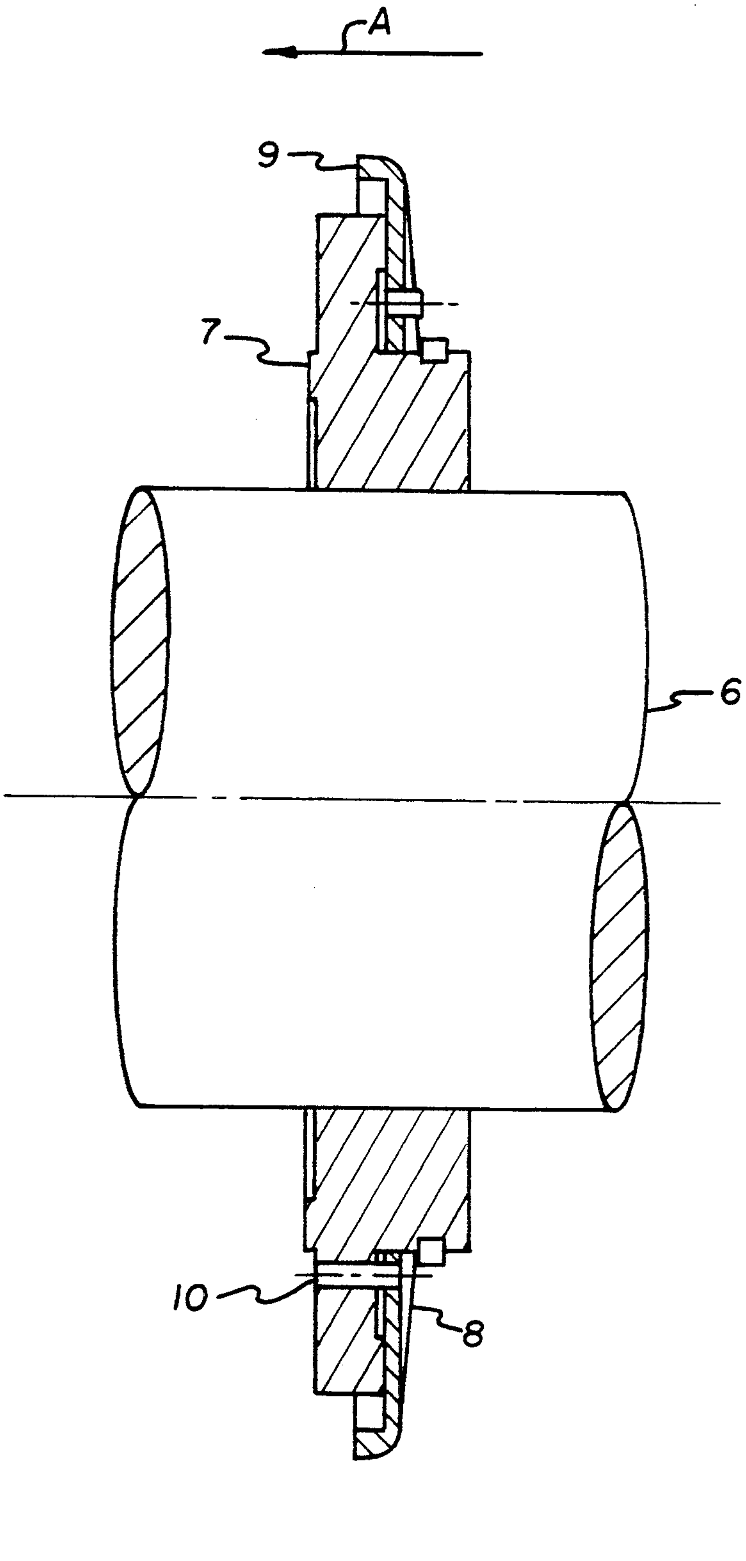
FIG. 2 (PRIOR ART)
FIG. 2 illustrates a conventional mounting device for knives according to FIG. 1.

In the prior art, these knives (9) as shown in FIG. 2, are generally mounted on a shaft (6) via ring (7) or support whose width defines the mounting pitch of the knives. The ring includes a lower portion on which the knife is directly mounted and an upper portion locking the knife for translation, when the spring blade (8), arranged as shown in FIG. 2 over the whole periphery of the knife is urged into contact with the upper knife. In operation, the knife-shaft moves from a distance ranging from 0.05 to 0.3 mm in the direction indicated by the arrow A. In response and in proportion to this displacement, the spring blade (8) generates a pressure of the knife shoulder on the lower knife. This pressure ranges generally from 1 kg to 3 kg. The knife is locked for rotation by means of a spindle (10).

Thus, in the prior art, the knife thickness illustrated in FIG. 1 corresponds about to 2 mm or more, in order to obtain a dimensionally stable blade. The diameter d of the central hole (2) is about 95 mm and the total diameter D of the knife is about 135 mm, i.e., the height of the so called "major surface" of the knife, viz. (D-d)/2, corresponds about to 20 mm. The weight of the assembly including the multistage ring, the spring blade and the knife is about 900 g. According to this same principle, in the prior art, there are other mounting types for this shoulder knife, which differ from the type previously mentioned with regard to the device which generates the pressure of the upper knife on the lower knife. In fact, it is known to use a system wherein the knife pressure is generated by 5 springs regularly spaced on the circumference of the knife. According to another known device, the pressure is generated by a metallic spring-like spiral, elongating in response to the slight displacement mentioned in the spring-blade device. Likewise, it is also known to replace this metallic spiral by a O-ring seal. For all these devices, variations in the pressure at the periphery of the knife are relatively significant and lead to bad quality cuts.

According to the present invention, the knife is of the type described with reference to FIG. 1. However, the dimensions of this knife are different from those known in the prior art. Indeed, the knife according to the present invention is designed to be mounted directly on the knife-shaft. Under these conditions, the central hole diameter is equal about to the shaft diameter, thus providing, for a same knife diameter, a major surface height higher than the one known up to now, and the manufacture of knives whose flexibility is sufficient to generate the required pressures on the lower knives (ranging from 1 to 3 kg and preferably, from 1 to 2 kg). Likewise, according to the present invention, the knives thickness is lower than the conventional knives thickness and ranges preferably from 0.8 to 1.4 mm.

Figure 3:
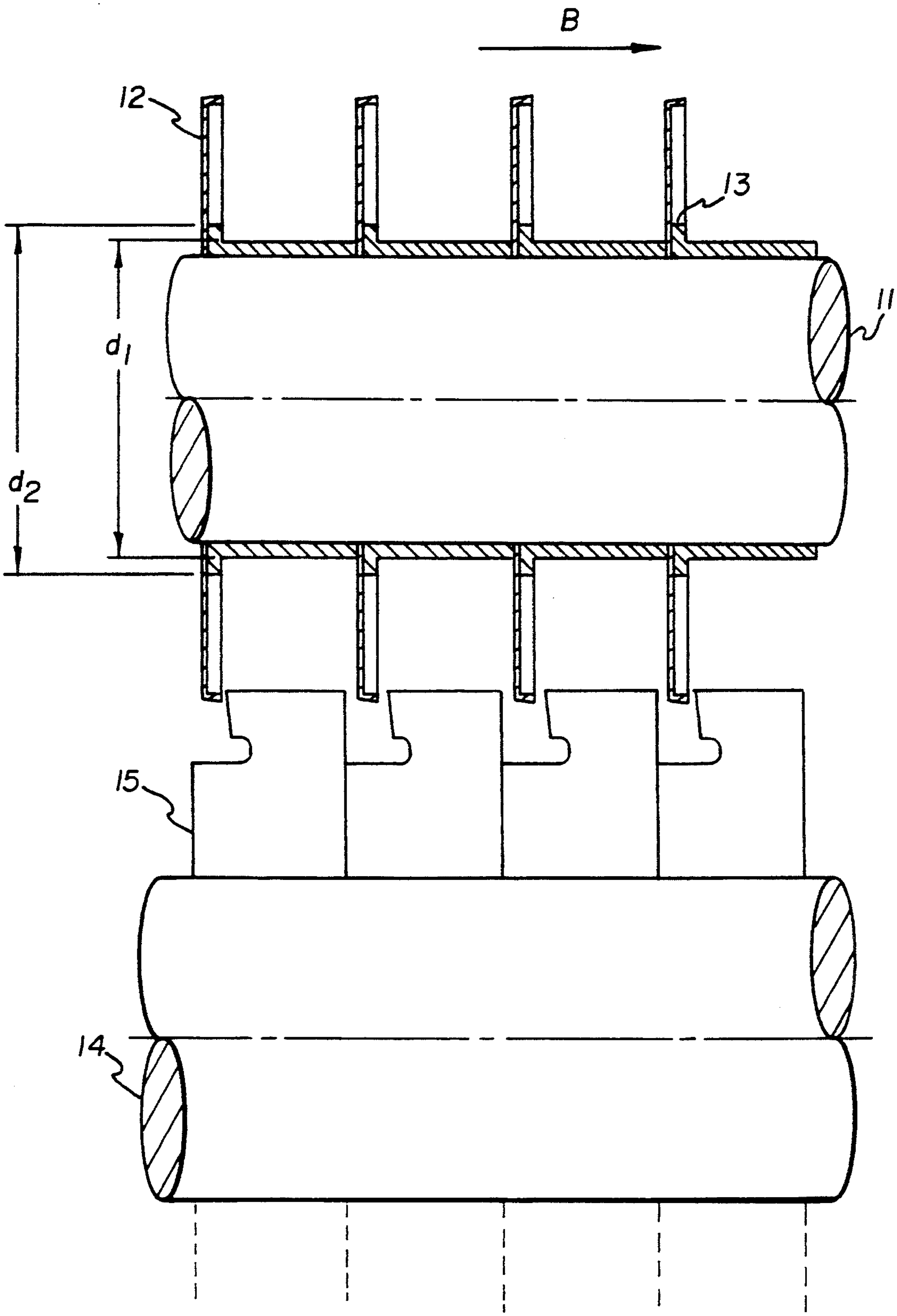
FIG. 3 illustrates a cutting device according to the present invention.

All these dimensional characteristics of the knife according to the invention are connected, and the knife flexibility depends in fact on the pressure to be obtained, on the knife thickness and diameter, on the shoulder thickness, on the knife major surface height and also, on the characteristics of the spacer used between each knife, which will be discussed in more detail hereinafter. Now, with reference to FIG. 3, a knife mounting device according to the present invention is illustrated. As shown in FIG. 3, the knives (12) are mounted directly on the cutting shaft (11). The knives are each spaced by a spacer sleeve (13) which helps to maintain the knives in cutting position and also to maintain the desired distance between them.

The desired number of knives are arranged on the cutting shaft, each knife being spaced by a spacer whose width depends on the desired cutting width, and then, by means of an appropriate clamping device, all these elements are clamped in order to lock them for rotation. According to a preferred embodiment, it was determined that it is advantageous to use a multistage spacer, as shown in FIG. 3, each spacer (13) having at one end a radially extended shoulder portion which engages the knife opposite the shoulder (3) of the knife. Such an arrangement helps to reduce significantly the vibrations generated by rotation of the knives.

In the cutting position, the upper knives (12) are urged into contact with the lower knives (15), themselves mounted on a shaft (14), arranged in a parallel relation with the first one. The pressure is generated by the response of the flexible knives to a slight displacement of the upper knife-shaft in the direction indicated by arrow B, when the upper knives are urged into contact with the lower knives. The weight of the assembly including the knife and the spacer does not exceed 200 g. Such a knife mounting directly on the cutting shaft permits application of a pressure of the upper knives on the lower knives, for a given displacement value, whose variations for each upper knife with respect to a mean value of the pressures of all of the upper knives ranging from 1 to 2 kg, do not exceed 10% in absolute value. It is obvious that such a device can comprise just a single knife. In this case, the knife is maintained in cutting position by means of a pair of spacer rings (13) arranged one on each side of the knife. According to a preferred embodiment, for the reasons previously mentioned, one of these spacers or rings is multistaged, particularly the one engaging the knife opposite the shoulder (3). The knife mounting of the invention permits grinding directly on the cutting shaft. Indeed, the complex spring mounting as in the prior art is no longer in use since its complex spring mounting exhibited the drawback of accumulating grinding dust when grinding was performed without removing the knives from the shaft or without separating them from their spring mounting mechanism. The mounting of the invention also helps to reduce the distortion of the knives faces.

According to a particular embodiment, the dimensional characteristics of a knife-shaft are the following:

| | | |
|---|---|---|
| knife-shaft diameter: | | 65 mm |
| knives total diameter: | | 138 mm |
| knife major surface height: | | 37.5 mm |
| shoulder thickness: | | 4.5 mm |
| knife major surface thickness: | | 1.2 mm |
| knife-shaft displacement: | | 0.08 mm |
| Pressure on the lower knives: | | 1.5 kg |
| spacer dimensions: | $d_1$: 80 mm | $d_2$: 72 mm |

In fact, the pressure must not be too great in order not to damage the knives too quickly, and preferably, for knife dimensions and displacement values of the shaft such as those previously mentioned, ranges from 1 to 2 kg. The corresponding thickness of the knife varies between 0.8 mm and 1.4 mm.

Tests were performed in order to measure, for different types of shoulder knives, the variations in absolute value, with respect to a mean value, of the pressures F of the upper knives on the lower knives and this, for a given value $\delta$ of the knife-shaft displacement. The pressure mean value is of the order of 1.5 kg for a displacement $\delta=0.12$ mm and 1 kg for a displacement $\delta=0.08$ mm.

| Knife types | F variations % $\delta = 0.12$ mm | F variation % $\delta = 0.08$ mm |
|---|---|---|
| I 5 springs knives | 16 | 13 |
| II Spring-blade knives | 33 | 20 |
| III O-ring knives | 57 | 30 |
| IV Metallic spiral knives | 16 | 10.5 |
| V Knives according to the invention | 10 | 6.5 |

Thus, these tests show that, with the knives according to the present invention, variations in the pressure not exceeding 10% are obtained, which is significantly lower than the results obtained with conventional knives.

Figure 4:
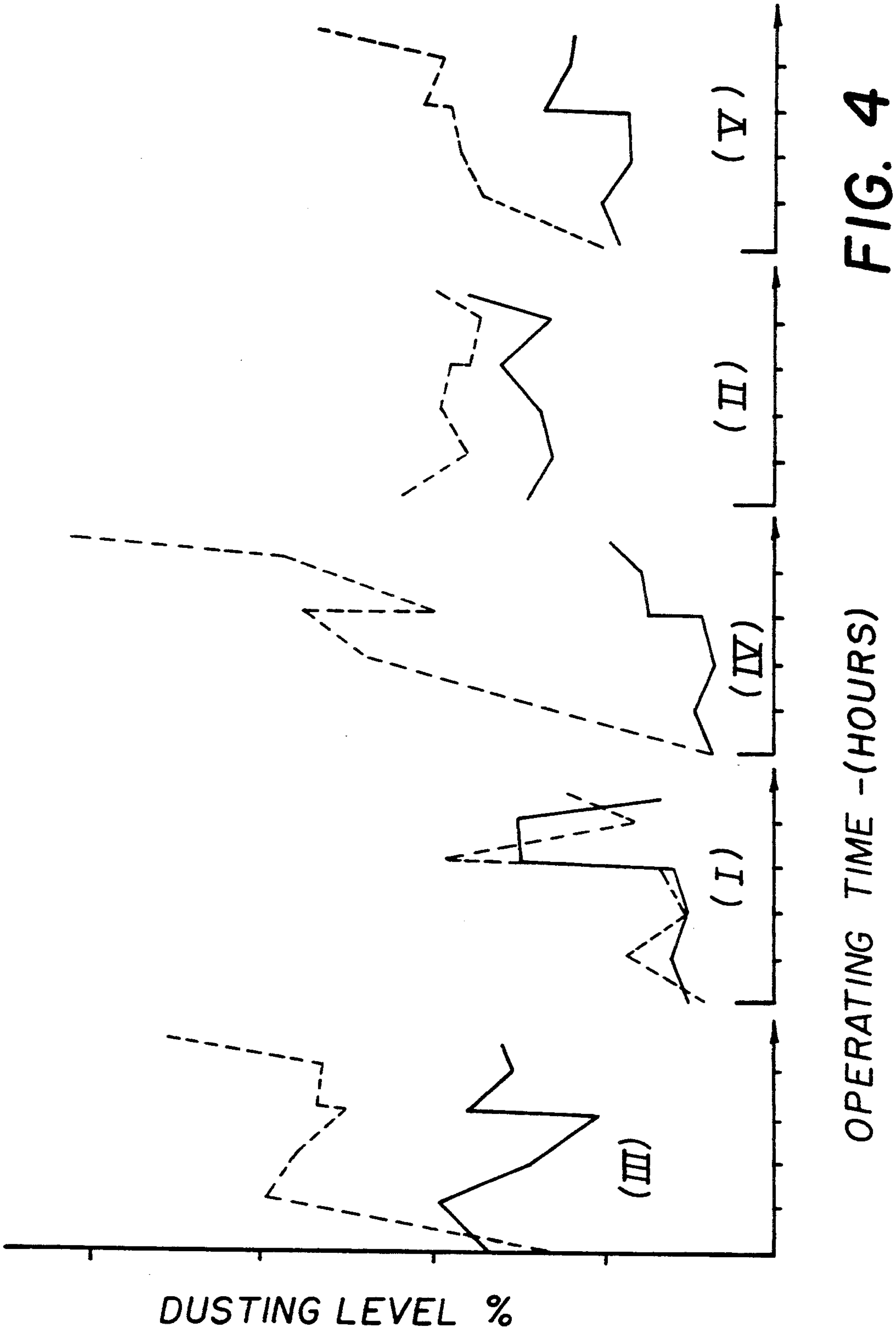
FIG. 4 illustrates the dusting test results obtained on one hand with a conventional cutting device and on the other hand, with the device of the present invention.

Likewise, dusting tests of the cut were performed, using on one hand conventional shoulder knives and on the other hand, shoulder knives according to the invention. The results are illustrated by the curves of FIG. 4.

Measures were performed for photographic materials including a support having thereon a photographic emulsion. This test consists in measuring, according to the knives operation time, the dusting in different locations of the cut. The measure principle is as follows: a web is cut by means of either cutting devices; it passes through two rollers opposite to each other and having thereon a double face adhesive; after some web length is passed, the adhesives are recovered and their optical density is measured by reflection or transmission, this density being more or less high, according to the dust quantity recovered by said adhesive. Thus, the dusting of a cut (I), emulsion side, and of a cut (II), support side, for a cutting edge facing the knife, and then the dusting of a cut (III), emulsion side, and of a cut (IV), support side, for a cutting edge located at the back of the knife, were successively measured. Diagram (V) represents the mean of the results obtained for the four previous measures. The curves in dashed lines represent the results obtained with conventional knives; the curves in continuous lines represent the results obtained with knives according to the invention. The operating hours number of the knife is reported in abscissa and the dusting level of the cut is reported in ordinate. The diagrams performed show that, in all cases, the dusting level obtained for the knives according to the invention is lower than the one obtained with conventional knives' the difference increasing generally with the knives operating time.

Tests showed that, by grinding the knives directly on the cutting shaft, about twice less material is removed on the knives compared to the case where the grinding is performed when the knives are removed from the shaft. Moreover, the time required for this operation is about 5 times less important.

We claim:

1. An apparatus for longitudinal cutting of web materials, the apparatus including a first shaft with a first diameter, a plurality of circular cutting knives mounted on the first shaft, each knife having a front face, a back face, a thickness, and a second diameter, and being provided with a central hole mounting the cutting knives directly on the first shaft; a plurality of spacer rings mounted on the first shaft, one spacer ring on each side of each cutting knife; a second shaft parallel to the first; a corresponding plurality of counter knives mounted on the second shaft in positions for engagement with the cutting knives, the improvement comprising:

an axially and radially extending shoulder on the periphery of the front surface of each cutting knife engaging the corresponding counter knife;

the cutting knives being mounted back face to front face directly on the first shaft; and the first diameter, second diameter, shoulder and thickness of each cutting knife being formed such that each cutting knife is sufficiently flexible so that an axial movement of one of the shafts with respect to the other engages the shoulder of each cutting knife with each corresponding counter knife and causes each cutting knife to flex to produce a force of engagement whose intensity is a function of a flexure of each cutting knife due to the amplitude of the axial movement, the force of engagement against each corresponding counter knife varying with respect to a mean value of the forces of engagement against all corresponding counter knives by not more than 10% in absolute value.

2. In an apparatus according to claim 1, the improvement further comprising:

each of the spacer rings includes a radially extended shoulder portion which engages the front surface of a corresponding cutting knife.

* * * * *